May 20, 1958  B. A. MACKEY  2,835,293
BORING TOOL
Filed March 18, 1955
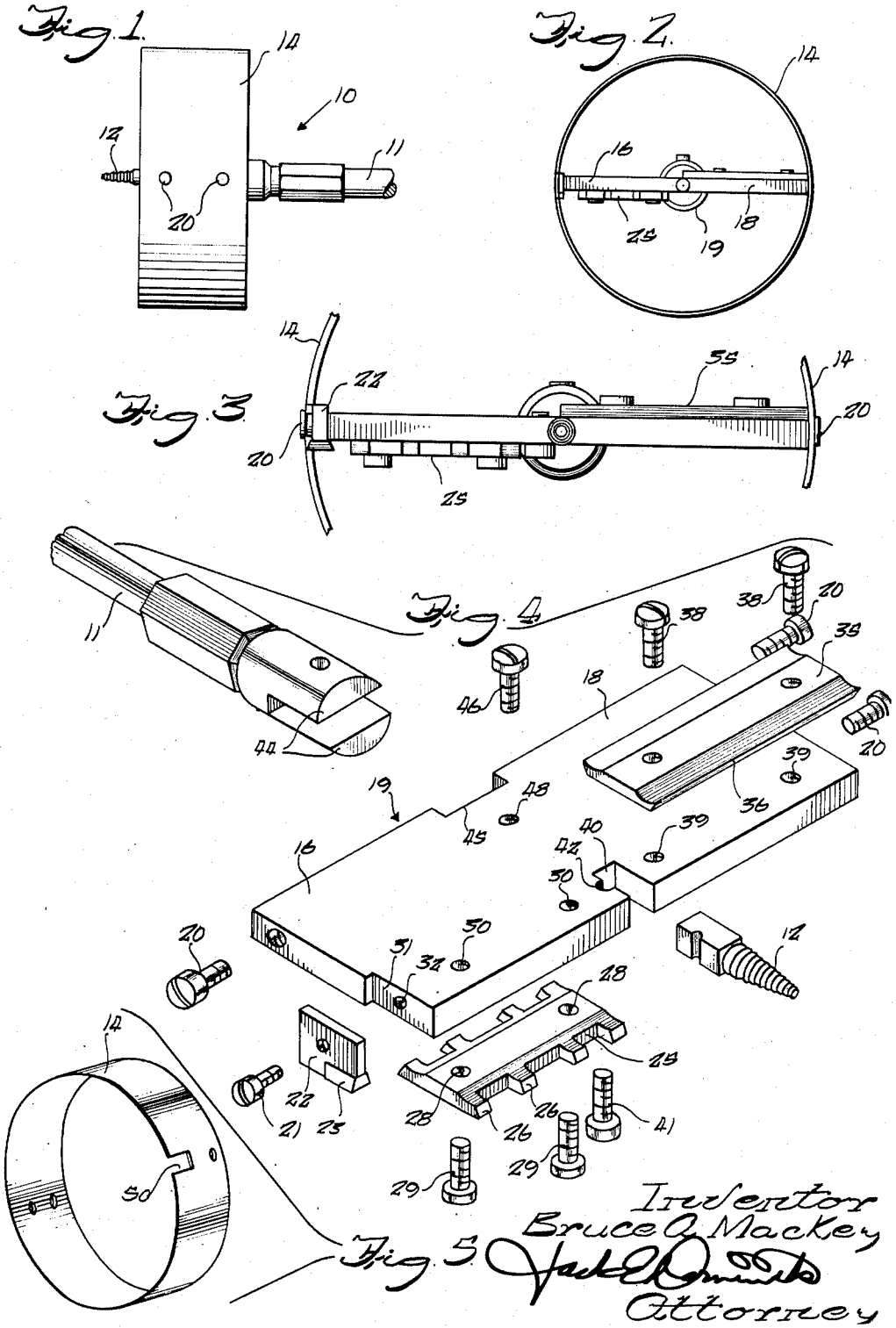

United States Patent Office 2,835,293
Patented May 20, 1958

2,835,293

BORING TOOL

Bruce A. Mackey, Libertyville, Ill.

Application March 18, 1955, Serial No. 495,180

3 Claims. (Cl. 145—126)

The present invention relates to boring tools, and has particular application in boring large-diameter holes through wood.

Many attempts have been made to design boring tools for cutting large-diameter holes through wood. The shortcomings of these attempts have been many. In some cases the entire unit requires resharpening at the factory. Some of the boring tools when going through a plurality of panels will remove a plug of wood which must be in turn removed before boring can continue. Also the boring tools presently available prove ineffective in boring at an angle as the breakout is generally accompanied by tearing and chipping.

Accordingly, the objects of the present invention are many. Primarily, the invention has for its object providing a large-diameter boring tool which is efficient in operation and inherently inexpensive to manufacture and maintain. An allied object of the invention is to provide a boring tool which requires considerably less power to cut comparable holes than conventional equipment.

Another object of the invention is to provide a boring tool which can bore large holes at an angle without a ragged breakthrough.

Still another object of the invention is to provide a boring tool for large-bore cutting which is self centering permitting long, true bores.

A further object of the invention is to provide a boring tool for which the cutting edges may be readily replaced, or resharpened.

Further objects and advantages of the present invention will become apparent as the following description of an illustrative embodiment proceeds taken in conjunction with the accompanying drawings, in which:

Figure 1 is a side view of a boring tool illustrative of the invention.

Fig. 2 is an end view of the boring tool shown in Fig. 1.

Fig. 3 is an end view in an enlarged scale from Fig. 1 showing in greater detail the cutting portion of the illustrative boring tool.

Fig. 4 is an exploded view of the boring tool elements except for the shield.

Fig. 5 is a perspective view of the boring tool shield.

The present invention proceeds from the realization that effective and efficient boring of wood at higher speeds requires a progressive two-fold cutting attack of the material. Accordingly, the cutting tool contemplated by the invention, and illustrated in the drawings as well as to be described in detail, employs a scarificator to chisel a plurality of concentric rings, the interstices of which are shaved by a plane type cutting edge which subsequently engages the surface prepared by the scarificator. For some applications, it may prove more satisfactory to employ a plurality of scarificators oriented to overlappingly chisel the cut.

To further increase the efficiency of the tool, a peripheral cutting tang may be employed to scribe the periphery of the bore and finish the surface of the bore. A shield is also provided to channel chip disposal, provide longitudinal directional stability, and assist in achieving a clean breakthrough particularly when boring at an angle through wood. The shield is particularly useful during hand-guided operation. When the tool is employed with a drill press, the shield is often unnecessary.

The details of the construction of an illustrative embodiment showing how the invention may be employed will be best appreciated by referring to the drawings. In Fig. 1, it will be seen that the boring tool 10 is driven by a shaft 11, which may be of any suitable length and include the necessary fittings and couplings to satisfactorily couple the boring tool 10 with a power source. A lead screw 12 has been employed to bore the pilot hole to be followed by the remainder of the boring tool. A shield 14 surrounds the cutting elements and serves to guide the boring tool as well as assist in chip removal. It will be seen from Fig. 2 that the shield 14 is cylindrical in shape and fixed to the boring tool by securing it to the wings 16, 18 of the cutting element support plate 19.

Referring now to Fig. 3, it will be seen that pairs of screws 20 have been employed to secure the cylindrical shield 14 to the blade support plate 19. One of these screws 21 serves the additional function of securing the peripheral scribing and finishing tang 22 to the table support plate 19.

A scarificator 25 is secured to the scarificator wing 16 of the table support plate 19. As will be seen from the exploded view in Fig. 4, the scarificator comprises a plurality of cutting chisels 26 along its edge, the cutting chisels of the scarificator preferably having a positive cutting angle and relief angles at the forward and side portions of each chisel. The width of the scarificator chisels 26 may differ depending upon the application intended. As a convenience to the user, the scarificator is double edged so that if one of the chisels 26 is broken or otherwise disabled in operation, the boring tool may be repaired on the job by merely reversing the scarificator blade 25. A pair of mounting holes 28 are provided in the scarificator which are engaged by scarificator mounting screws 29 which are threadedly received by the scarificator wing 16 of the blade mounting plate 19 through the threaded holes 30 provided in that wing.

For some applications, more than one scarificator may be employed. By staggering the radial location of the scarificator teeth, the entire cutting area may be traversed by a gang of scarificator teeth. Also the width and shape of the scarificator teeth may vary with different applications. In this light, the interchangeability of the scarificator blades becomes a distinct advantage to the user.

The peripheral cutting tang 22 is received by the tang recess 31 at the edge of the scarificator wing 16 of the blade support plate 19. The shield mounting screw 21 is threadedly received in the hole 32 in the scarificator 16 thereby mounting the tang securely to the cutter blade plate 19. The chisel 23 of the cutting tang normally extends ahead of that of the scarificator chisels 26. The peripheral cutting edge of the tang serves to dress the hole as the bore progresses through the material being cut. The actual shape of the peripheral cutting tang may vary considerably depending upon its intended application. Cutting angles and relief angles will necessarily conform to the material being worked.

It will be appreciated that as the scarificator chisels 26 cut through the material, a plurality of concentric ridges and grooves are formed in the material. These ridges are then engaged by the forward cutting edge 36 of the plane 35. The plane 35, just as the scarificator 25, is provided with working surfaces along both of its edges so that it, too, may be reversed in case the cutting edge is disabled. A pair of mounting screws 38 are employed to securely fix the plane 35 to the plane wing 18 of the cutting blade plate 19 by threadedly engaging the holes 39 in the wing 18. It will be noted that the cutting edge 36 of the chisel 35 has sufficient rake to curl the chips and progressively engage the material being cut thereby efficiently shaving the ridges that are left by the chisels 26 of the scarificator 25.

In order to guide the boring tool, a lead 12 has been provided which is received in a lead slot 40 at the central portion of the blade support plate 19. A lead mounting screw 41 is threadedly offset from the lead slot 40 removably securing the lead screw in place.

In some instances, the lead point 12 will have a plain point rather than the threads as shown. This will be particularly so when the tool is intended for use with a drill press.

The drive shaft 11 is slotted at its end portion presenting a pair of jaws 44 which grip the cutting blade plate 19 and are secured against lateral motion by the drive shaft slot 45 in the cutting blade plate 19. A drive shaft mounting screw 46 received by the draft shaft threaded mounting hole 48 completes the drive assembly to the cutting tool.

The cutting shield 14 then surrounds the blade mounting plate by being secured to the ends of its winged portions. As will be seen from Fig. 5, a scribing tang slot 50 has been provided in one edge of the shield 14 so that the tang cutting edge 23 presents the peripheral member of the assembled unit.

From the foregoing assembly description, it will be apparent that each of the elements of the boring tool may be independently disassembled from the unit and replaced if broken. The cutting elements may be reversed for additional usage on the job site. The elements are simple and relatively inexpensive to manufacture and yet co-operate to produce an effective cutting tool which may be built up to cut large diameters through various materials.

In operation, it has been found that a high speed drill can be employed successfully in boring through wood. The scarifying action of the scarificator greatly reduces the power required to drill the holes of the diameters contemplated for effective and efficient use of the boring tool. The scarificator also increases the efficiency of the cutting unit when boring through plywood as it reduces the tendency for the cutting tool to pick up rings of the various laminations and spin them around thereby clogging the boring tool. The peripheral cutting tang dresses up the bore as well as co-operates with the lead to guide the central heavy working elements of the boring tool.

By employing a peripheral shield in the form of a cylinder, longitudinal stability throughout the cut is insured. The shield is particularly advantageous when hand-guiding is involved. If it is desired to bore through a plurality of members, such as would be encountered if boring through joists or wall studing, an extended drive shaft may be employed with a plurality of guide rings of similar configuration to the shield 14 to guide the tool for a plurality of coaxial cuts.

It has also been observed that the cutting shield combines with the remaining elements of the boring tool to slowly accomplish breakthrough when the tool is employed at an angle. This action reduces the probability of chipping and splitting to a minimum. The same effect is also achieved when going through various types of contiguous materials which may be separated by air gaps or laminated as is the case with plywood.

Although a particular embodiment of the invention has been shown and described in detail here, there is no intention to thereby limit the invention to the details of such embodiment. On the contrary, the intention is to cover all modifications, alternative embodiments, usages and equivalents of the boring tool as fall within the spirit and scope of the invention, specification and appended claims.

I claim as my invention:

1. A boring tool, comprising: a shaft; a flat plate secured to the end of said shaft intermediate the ends of said plate, the shaft being in the plane of the plate; a lead point extending from said plate in line with the shaft; a scarificator detachably mounted on the plate at the lead edge to one side of the line of the shaft to make a plurality of concentric cuts; a blade detachably mounted on the plate at the lead edge to the other side of the line of the shaft to remove the ridges left by the action of the scarificator; a guide ring coaxial with the shaft and mounted on the ends of the plate; and a removable peripheral scribing and dressing tang mounted on the plate and extending outwardly to the periphery of said guide ring.

2. The boring tool of claim 1 wherein the plate is provided with an axial slot and the lead point is removably mounted in said slot.

3. The boring tool of claim 1 wherein the plate is provided with a tang receiving offset at the outer end of one lead edge, the guide ring is provided with a tang receiving recess overlying the offset of the plate, and the tang is removably mounted in the offset and extends into the recess to the periphery of the guide ring.

References Cited in the file of this patent

UNITED STATES PATENTS

| 124,089 | Shepardson | Feb. 27, 1872 |
| 503,224 | Adams | Aug. 15, 1893 |
| 654,861 | Tynan | July 31, 1900 |
| 1,499,584 | Litchfield | July 1, 1924 |
| 2,721,592 | Baker | Oct. 25, 1955 |

FOREIGN PATENTS

| 814,939 | Germany | Sept. 27, 1951 |
| 897,153 | Germany | Nov. 19, 1953 |